United States Patent
Komatsu (10) Patent No.: US 11,156,907 B2
(45) Date of Patent: Oct. 26, 2021

(54) LIGHT SOURCE APPARATUS AND PROJECTION DISPLAY APPARATUS

(71) Applicant: SONY CORPORATION, Tokyo (JP)

(72) Inventor: Yoshikazu Komatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/098,036

(22) PCT Filed: Mar. 1, 2017

(86) PCT No.: PCT/JP2017/008148
§ 371 (c)(1),
(2) Date: Oct. 31, 2018

(87) PCT Pub. No.: WO2017/203782
PCT Pub. Date: Nov. 30, 2017

(65) Prior Publication Data
US 2019/0155134 A1    May 23, 2019

(30) Foreign Application Priority Data

May 24, 2016  (JP) .............................. JP2016-103230

(51) Int. Cl.
*F21S 2/00* (2016.01)
*G03B 21/14* (2006.01)
(Continued)

(52) U.S. Cl.
CPC ............. *G03B 21/204* (2013.01); *F21S 2/00* (2013.01); *F21V 9/08* (2013.01); *G03B 21/006* (2013.01); *G03B 21/14* (2013.01); *G03B 33/12* (2013.01)

(58) Field of Classification Search
CPC .... G03B 21/204; G03B 21/006; G03B 33/12; G03B 21/14; F21V 9/30; F21V 9/40; F21V 9/08; F21S 2/00
See application file for complete search history.

(56) References Cited

U.S. PATENT DOCUMENTS

2008/0089089 A1    4/2008  Hama et al.
2008/0231162 A1    9/2008  Kurihara et al.
(Continued)

FOREIGN PATENT DOCUMENTS

CN    102650811 A    8/2012
CN    103717963 A    4/2014
(Continued)

OTHER PUBLICATIONS

International Search Report dated May 30, 2017, in PCT/JP2017/008148, filed Mar. 1, 2017.
(Continued)

*Primary Examiner* — Michelle M Iacoletti
*Assistant Examiner* — Danell L Owens
(74) *Attorney, Agent, or Firm* — Oblon, McClelland, Maier & Neustadt, L.L.P.

(57) ABSTRACT

[Object] To implement a light source apparatus that is high in efficiency and has favorable color reproducibility.

[Solution] There is provided a light source apparatus including: a light source configured to output light in a first wavelength region; and a wavelength conversion member including a first fluorescent substance and a second fluorescent substance, the first fluorescent substance being excited by the light in the first wavelength region to emit light in a second wavelength region, the second fluorescent substance being stacked on the first fluorescent substance and excited by the light in the first wavelength region and the light in the second wavelength region to emit light in a third wavelength region.

10 Claims, 6 Drawing Sheets

(51) Int. Cl.
*F21V 9/08* (2018.01)
*G03B 21/00* (2006.01)
*G03B 33/12* (2006.01)
*G03B 21/20* (2006.01)

(56) References Cited

U.S. PATENT DOCUMENTS

| | | | |
|---|---|---|---|
| 2009/0189512 A1* | 7/2009 | Miyaguchi | H01L 33/46 313/501 |
| 2009/0321758 A1 | 12/2009 | Liu et al. | |
| 2011/0149549 A1* | 6/2011 | Miyake | F21V 9/32 362/84 |
| 2014/0153216 A1* | 6/2014 | Yamanaka | F21V 5/04 362/84 |
| 2014/0347860 A1* | 11/2014 | Yang | F21V 9/45 362/293 |
| 2015/0098070 A1* | 4/2015 | Hsieh | F21V 9/38 355/67 |
| 2015/0338727 A1* | 11/2015 | Sugiyama | H04N 9/3158 362/84 |
| 2016/0116122 A1* | 4/2016 | Chang | H04N 9/3105 362/84 |
| 2016/0150200 A1* | 5/2016 | Saka | G03B 21/005 353/31 |
| 2017/0090276 A1 | 3/2017 | Kashihara | |

FOREIGN PATENT DOCUMENTS

| | | | |
|---|---|---|---|
| CN | 104062837 A | | 9/2014 |
| CN | 104516180 A | | 4/2015 |
| JP | 2000-031531 A | | 1/2000 |
| JP | 2005-244075 A | | 9/2005 |
| JP | 2005-244076 A | | 9/2005 |
| JP | 2005244076 A | * | 9/2005 |
| JP | 2006-32726 A | | 2/2006 |
| JP | 2008-41739 A | | 2/2008 |
| JP | 2008-71806 A | | 3/2008 |
| JP | 2008-186777 A | | 8/2008 |
| JP | 2011-129354 A | | 6/2011 |
| JP | 2013-79311 A | | 5/2013 |
| JP | 5767444 B2 | | 8/2015 |
| JP | 5770433 B2 | | 8/2015 |
| JP | 2017-75973 A | | 4/2017 |
| WO | WO 2006/038502 A1 | | 4/2006 |
| WO | WO 2015/190032 A1 | | 12/2015 |

OTHER PUBLICATIONS

Extended European Search Report dated Nov. 12, 2019 in Patent Application No. 17802384.2.

* cited by examiner

LIGHT SOURCE APPARATUS AND PROJECTION DISPLAY APPARATUS

TECHNICAL FIELD

The present disclosure relates to a light source apparatus used for a projection display apparatus such as a projector, and a projection display apparatus including this.

BACKGROUND ART

In recent years, projectors for projecting and displaying images upon screens and the like have been used in a variety of situations such as meeting rooms, classrooms, home theaters, and theaters. Projectors have conventionally used mercury lamps from the perspective of brightness and cost performance. However, when used for a long time, mercury lamps need regularly exchanging, and require some time to turn on. Then, from the perspective of long lifetime, high function addition, and the like, solid-state light sources each of which has a long lifetime and a wide color gamut have been attracting attention as the light sources of projectors. A solid-state light source is a light source that uses a luminous phenomenon caused by semiconductor p/n junction, and includes an LED, a laser diode (LD), and the like. Today, light source apparatuses, for example, like Patent Literatures 1 and 2 each of which irradiates a fluorescent substance material that emits, when irradiated with light in a specific wavelength region, light in a wavelength region different from that of the light with light from a solid-state light source, and uses fluorescing light are used for projectors and the like.

CITATION LIST

Patent Literature

Patent Literature 1: JP 5767444B
Patent Literature 2: JP 5770433B

DISCLOSURE OF INVENTION

Technical Problem

Here, it is desirable as a light source for a projector that it be possible to display a standard color gamut and a white color of an image display apparatus based on the DCI standard, sRGB, and the like. For example, providing a light source with the respective emission spectra of a red wavelength region, a green wavelength region, and a blue wavelength region makes it possible to display a color close to the standard above in the respective primary colors of red, green and blue, and the white color at the time when these primary colors are concurrently turned on.

It is also conceivable that a light source having such emission spectra is implemented, for example, by outputting the respective colors of red, green, and blue from a solid-state light source, but it is also possible to implement the light source by using fluorescent substances like Patent Literatures 1 and 2 above. However, in the case where fluorescent substances are used, it is difficult to balance the respective emission spectra of the red wavelength region, the green wavelength region, and the blue wavelength region. The amount of light in a specific wavelength region runs short in some cases. Then, it is desired to implement a light source apparatus that is high in efficiency and has favorable color reproducibility.

Solution to Problem

According to the present disclosure, there is provided a light source apparatus including: a light source configured to output light in a first wavelength region; and a wavelength conversion member including a first fluorescent substance and a second fluorescent substance, the first fluorescent substance being excited by the light in the first wavelength region to emit light in a second wavelength region, the second fluorescent substance being stacked on the first fluorescent substance and excited by the light in the first wavelength region and the light in the second wavelength region to emit light in a third wavelength region.

In addition, according to the present disclosure, there is provided a projection display apparatus including: a light source section; a light modulation synthesis system configured to modulate and synthesize incident light; an illumination optical system configured to guide light output from the light source section to the light modulation synthesis system; and a projection optical system configured to project an image output from the light modulation synthesis system. The light source section includes a light source configured to output light in a first wavelength region, and a wavelength conversion member including a first fluorescent substance and a second fluorescent substance, the first fluorescent substance being excited by the light in the first wavelength region to emit light in a second wavelength region, the second fluorescent substance being stacked on the first fluorescent substance and excited by the light in the first wavelength region and the light in the second wavelength region to emit light in a third wavelength region.

Advantageous Effects of Invention

According to the present disclosure as described above, it is possible to implement a light source apparatus that is high in efficiency and has favorable color reproducibility. Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be provided in the following order.
1. First Embodiment (Transmissive Fluorescence Wheel)
1.1. Schematic Configuration of Projection Display Apparatus
1.2. Configuration of Light Source Apparatus
1.3. Specific Example
2. Second Embodiment (Reflecting Fluorescence Wheel)
2.1. Configuration of Light Source Apparatus
2.2. Specific Example

1. First Embodiment

1.1. Schematic Configuration of Projection Display Apparatus

Figure 1:
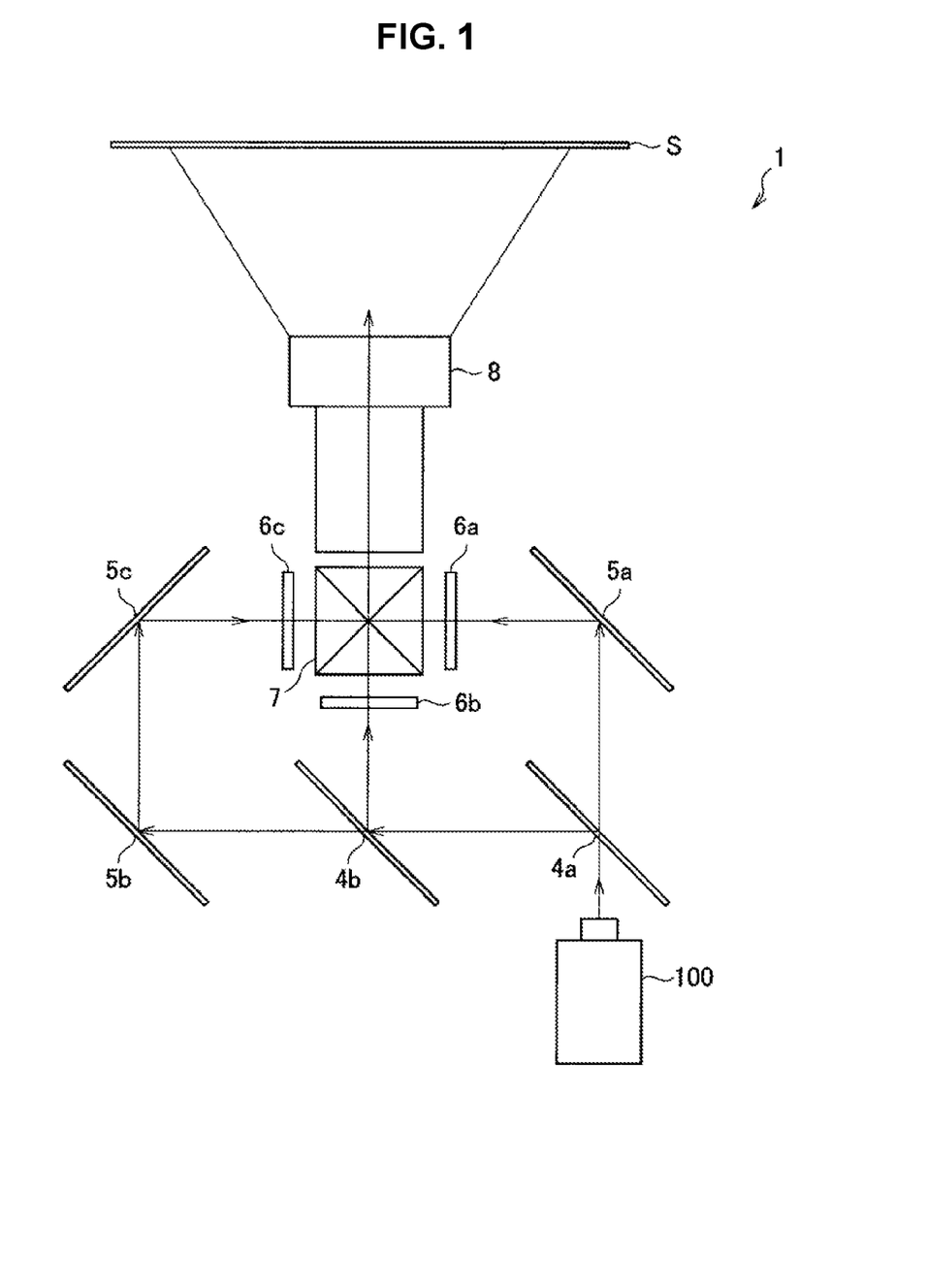
FIG. 1 is a schematic configuration diagram illustrating a configuration example of a projection display apparatus including a light source apparatus according to a first embodiment of the present disclosure.

First, with reference to FIG. 1, a configuration example of a projection display apparatus 1 including a light source apparatus 100 according to a first embodiment of the present disclosure as a light source section will be described. FIG. 1 is a schematic configuration diagram illustrating a configuration example of the projection display apparatus 1 including the light source apparatus 100 according to the present embodiment.

The projection display apparatus 1 illustrated in FIG. 1 is a configuration example of 3-LCD (liquid crystal display) projector. The 3-LCD projector separates white light to the three primary colors of red, green and blue, and have them pass through three respective LCDs to generate an image to be projected upon a display surface such as a screen S. The white light is output from the light source apparatus 100, which is a light source section.

More specifically, the white light output from the light source apparatus 100 is incident on a first reflecting dichroic mirror 4a that transmits, for example, only light in a blue wavelength region, and reflects light in the other wavelength regions. This causes the light in the blue wavelength region to pass through the first reflecting dichroic mirror 4a onto a reflecting mirror 5a side. Then, the light in the blue wavelength region is reflected by the reflecting mirror 5a to be incident on a liquid crystal panel 6a for blue.

Meanwhile, the light in the other wavelength regions which is reflected by the first reflecting dichroic mirror 4a is incident on a second reflecting dichroic mirror 4b. The second reflecting dichroic mirror 4b reflects only light in a green wavelength region, and transmits light in the other wavelength regions, that is, light in a red wavelength region. The light in the green wavelength region which is reflected by the second reflecting dichroic mirror 4b is incident on a liquid crystal panel 6b for green. In addition, the light in the red wavelength region which passes through the second reflecting dichroic mirror 4b is reflected by reflecting mirrors 5b and 5c, and then incident on a liquid crystal panel 6c for red.

The liquid crystal panels 6a to 6c for the respective colors modulate light incident thereon in accordance with input image signals, and generate signal light of images corresponding to RGB. As the liquid crystal panels 6a to 6c, for example, transmissive liquid crystal elements using high temperature poly-silicon TFT may be used. The signal light modulated by the respective liquid crystal panels 6a to 6c is incident on a dichroic prism 7, and synthesized. The dichroic prism 7 has a cuboid shape obtained by combining four triangular prisms so as to reflect red signal light and blue signal light, and transmit green signal light. The signal light of each color which is synthesized by the dichroic prism 7 is incident on a projection lens 8, and projected upon a display surface such as the screen S as an image.

In the projection display apparatus 1, the liquid crystal panels 6a to 6c and the dichroic prism 7 function as a light modulation synthesis system that modulates and synthesizes incident light. In addition, the reflecting dichroic mirrors 4a and 4b and the reflecting mirrors 5a to 5c function as an illumination optical system that guides light from the light source apparatus 100 serving as a light source section to the liquid crystal panels 6a to 6c included in the light modulation synthesis system. Then, the projection lens 8 functions as a projection optical system that projects an image output from the dichroic prism 7.

1.2. Configuration of Light Source Apparatus

Figure 2:
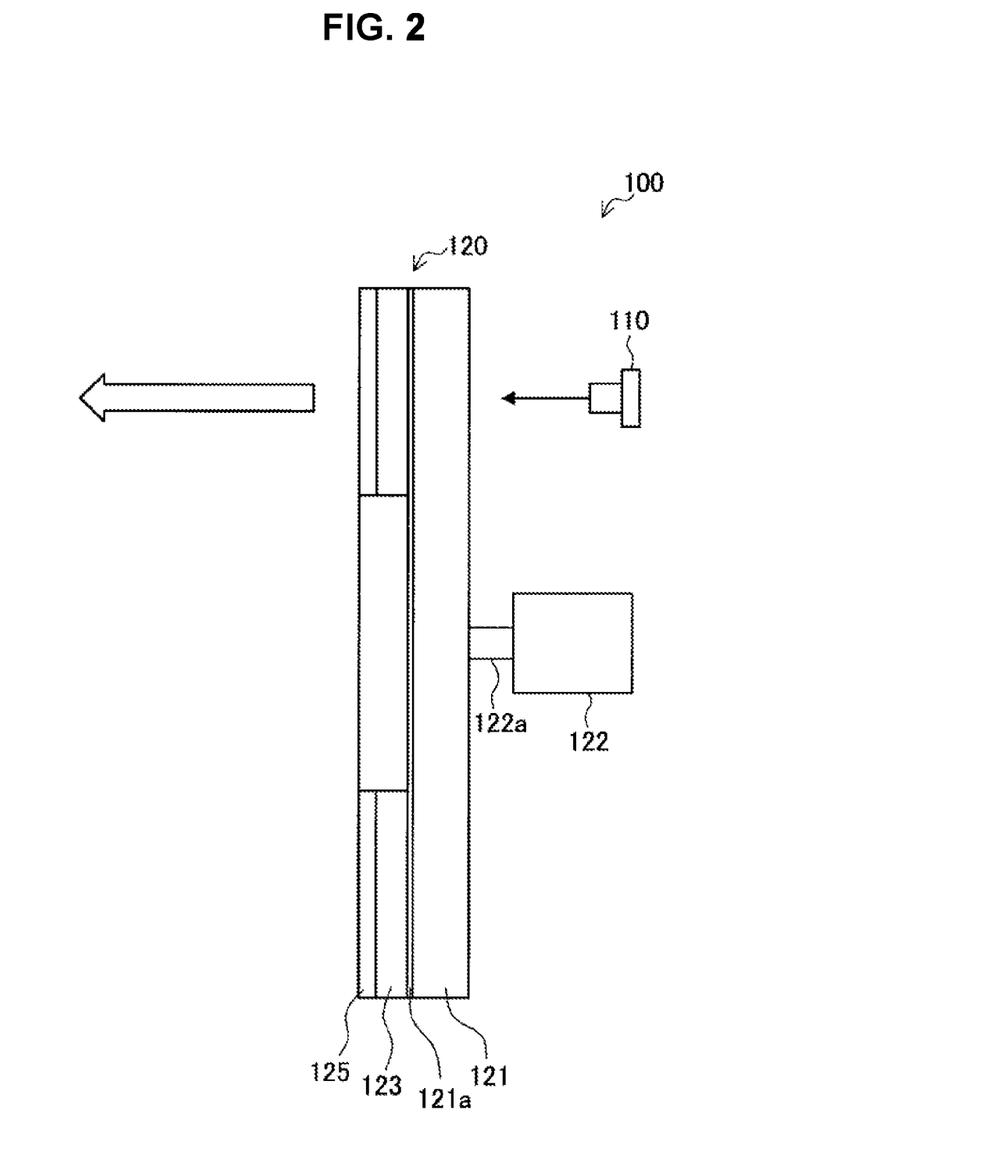
FIG. 2 is a schematic configuration diagram illustrating an example of the light source apparatus according to the embodiment.

The present embodiment uses, as the light source apparatus 100 of the projection display apparatus 1, a light source apparatus that uses a transmissive wavelength conversion member including a plurality of fluorescent substance layers to generate and output white light. For example, as illustrated in FIG. 2, the light source apparatus 100 includes a light source 110 and a wavelength conversion member 120.

The light source 110 is a light emitting section that outputs light on which light output from the light source apparatus 100 is based. The light source 110 is, for example, a laser diode or the like, and outputs light in a first wavelength region. The light output from the light source 110 is incident on the wavelength conversion member 120 via a condensing lens (not illustrated).

The wavelength conversion member 120 is a member that converts part of the light output from the light source 110 into light in a wavelength region different from the first wavelength region of the incident light. To convert the wavelength region of light, a fluorescent substance is used. For example, the wavelength conversion member 120 is configured as a transmissive fluorescent substance wheel. Specifically, the wavelength conversion member 120 includes, as illustrated in FIG. 2, a base material 121, a drive section 122, a first fluorescent substance 123, and a second fluorescent substance 125.

The base material 121 is a member on which the first fluorescent substance 123 and the second fluorescent substance 125 are stacked. Light output from the light source 110 passes through the base material 121, and is incident on the first fluorescent substance 123. Therefore, the base material 121 includes a transparent member such as sapphire such that the light from the light source 110 can pass. The base material 121 is, for example, disk-shaped. To the center thereof, a rotary shaft 122a of the drive section 122 is attached. The rotary shaft 122a of the drive section 122 is rotated, thereby making it possible to rotate the base material 121 as well. A laser diode used as the light source 110 like the light source apparatus 100 according to the present embodiment serves as a point light source. Therefore, heat is concentrated at the position at which light from the light source 110 is output, resulting in high temperature. Then, a rotatable configuration like the wavelength conversion member 120 according to the present embodiment, and radiation of light with the base material 121 rotated make it possible to distribute light radiation positions on the base material 121.

The first fluorescent substance 123 is a fluorescent substance layer stacked on the base material 121. The first fluorescent substance 123 is provided, for example, to the surface of the base material 121 on the opposite side to the light source 110. Specifically, for example, as illustrated in FIG. 2, the first fluorescent substance 123 may be provided in an annular pattern concentric with the disk-shaped base material 121. The first fluorescent substance 123 is provided onto the base material 121, for example, by applying screen printing to a binder mixed with a fluorescent agent.

The first fluorescent substance 123 is excited by light passing through the base material 121 from the light source 110, and emits light in a wavelength region which is different from the incident light in the first wavelength region. Note that the first fluorescent substance 123 transmits part of the light output from the light source 110. Thus, when light in the first wavelength region is incident on the first fluorescent substance 123 from the light source 110, the light in the first wavelength region and light in a second wavelength region which is emitted by exciting the first fluorescent substance 123 are output. At this time, a reflection film 121a that reflects the light in the second wavelength region which is emitted by exciting the first fluorescent substance 123 may be provided between the first fluorescent substance 123 and the base material 121. Providing the reflection film 121a like this makes it possible to prevent the light in the second wavelength region which is emitted by exciting the first fluorescent substance 123 from being output to the base material 121 side, and reliably output the light in the second wavelength region onto the second fluorescent substance 125 side.

The second fluorescent substance 125 is a fluorescent substance layer stacked on the first fluorescent substance 123. Specifically, for example, as illustrated in FIG. 2, similarly to the first fluorescent substance 123, the second fluorescent substance 125 may be provided on the first fluorescent substance 123 in an annular pattern concentric with the disk-shaped base material 121. Similarly to the first fluorescent substance 123, the second fluorescent substance 125 may be provided onto the first fluorescent substance 123 provided on the base material 121, for example, by applying screen printing to a binder mixed with a fluorescent agent.

The second fluorescent substance 125 is excited by the light in the first wavelength region which is output from the light source 110 and the light in the second wavelength region which is emitted from the first fluorescent substance 123, and emits light in a third wavelength region different from the first wavelength region and the second wavelength region. Note that the second fluorescent substance 125 transmits part of the light output from the light source 110 and part of the light in the second wavelength region. Thus, when the light in the first wavelength region and the light in the second wavelength region are incident on the second fluorescent substance 125, the light in the first wavelength region, the light in the second wavelength region, and the light in the third wavelength region which is emitted by exciting the second fluorescent substance 125 are output. At this time, the wavelength (i.e. third wavelength region) of the light emitted from the second fluorescent substance 125 may be greater than the wavelength (i.e. second wavelength region) of the light emitted from the first fluorescent substance 123.

1.3. Specific Example

Figure 3:
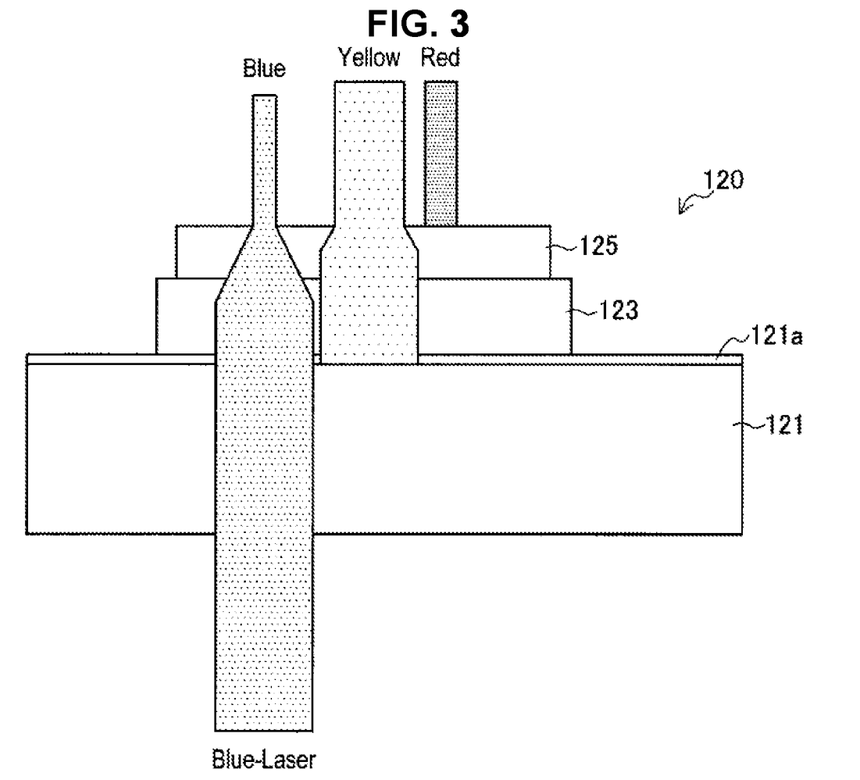
FIG. 3 is an explanatory diagram illustrating a specific example of the light source apparatus according to the embodiment.

For example, the case will be considered where a blue laser diode that emits light in the blue wavelength region is used as the light source 110. The light in the blue wavelength region which is output from the light source 110 passes through the base material 121 and the reflection film 121a as illustrated in FIG. 3, and is incident on the first fluorescent substance 123. Here, the first fluorescent substance 123 is assumed to be a fluorescent substance that is excited by the incident light, and emits light including light in the green wavelength region and light in the red wavelength region. The light in which light in the green wavelength region and light in the red wavelength region are blended looks yellow, so that the following also refers to the fluorescent substance as yellow fluorescent substance. Part of light in the blue wavelength region which is incident on the first fluorescent substance 123 passes through it as it is, and part thereof excites the first fluorescent substance 123 to be light including light in the green wavelength region and light in the red wavelength region. FIG. 3 illustrates light in the blue wavelength region as blue light (Blue), and light including light in the green wavelength region and light in the red wavelength region as yellow light (Yellow).

Figure 4:
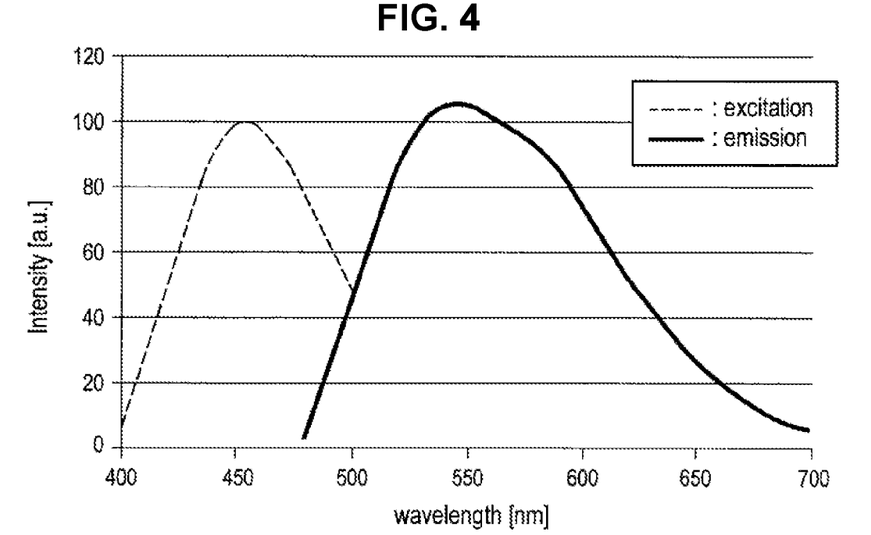
FIG. 4 is a graph illustrating an example of an excitation spectrum and an emission spectrum of a yellow fluorescent substance.

FIG. 4 illustrates an example of an excitation spectrum and an emission spectrum of a yellow fluorescent substance. As demonstrated by a dashed line in FIG. 4, a yellow fluorescent substance is excited in a wavelength region of approximately 400 nm to 500 nm, and the emission intensity of light close to a wavelength of 450 nm in particular is high. This wavelength region of approximately 400 to 500 nm corresponds to the blue wavelength region. Thus, it is possible to use light in the blue wavelength region to efficiently excite a yellow fluorescent substance, and cause the yellow fluorescent substance to emit light including light in the green wavelength region and light in the red wavelength region. Note that the emission spectrum of light emitted from the yellow fluorescent substance has a wavelength region of approximately 500 to 700 nm as demonstrated by a solid line in FIG. 4. Specifically, this wavelength region includes the green wavelength region (approximately 500 to 580 nm) and the red wavelength region (approximately 580 to 700 nm). The present disclosure assumes that it is sufficient for the second wavelength region of light emitted from the first fluorescent substance 123 to include a part of these wavelength regions. FIG. 3 assumes that the second wavelength region includes the green wavelength region and the red wavelength region. When light in the blue wavelength region is incident on the first fluorescent substance 123, the light in the blue wavelength region, and light including light in the green wavelength region and light in the red wavelength region are output.

The light in the blue wavelength region, and the light including light in the green wavelength region and light in the red wavelength region which are output from the first fluorescent substance 123 are then incident on the second fluorescent substance 125 as illustrated in FIG. 3. The second fluorescent substance 125 is assumed to be a red fluorescent substance that is excited by the incident light to emit light in the red wavelength region. Part of the light in the blue wavelength region, and the light including light in the green wavelength region and light in the red wavelength region which are incident on the second fluorescent substance 125 passes through it as it is, and part thereof excites the second fluorescent substance 125 to be light in the red wavelength region. FIG. 3 illustrates light in the red wavelength region as red light (Red).

Figure 5:
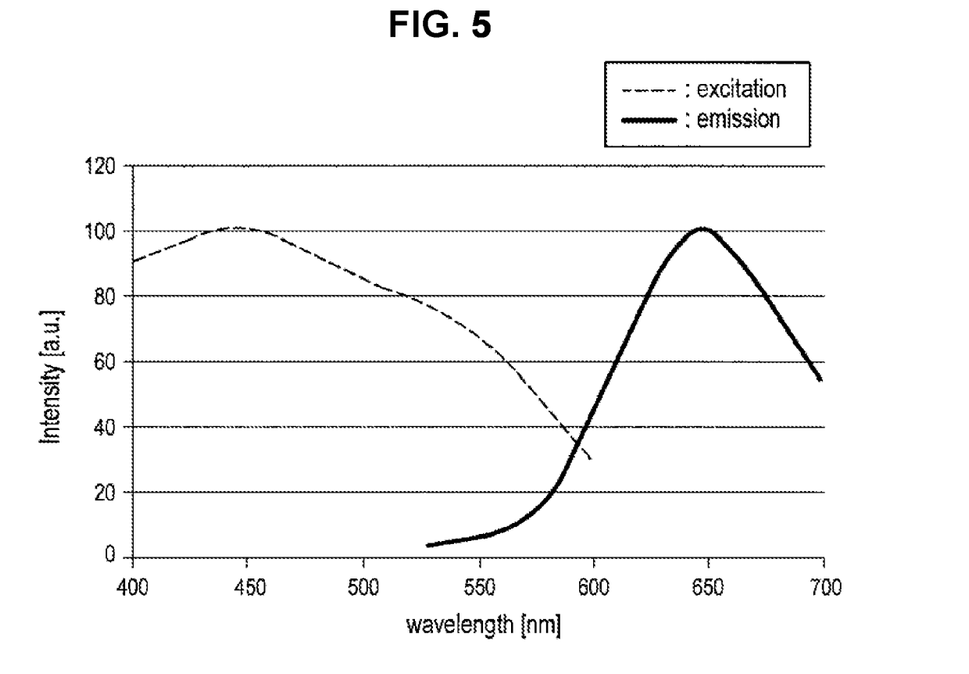
FIG. 5 is a graph illustrating an example of an excitation spectrum and an emission spectrum of a red fluorescent substance.

FIG. 5 illustrates an example of an excitation spectrum and an emission spectrum of a red fluorescent substance. As demonstrated by a dashed line in FIG. 5, a red fluorescent substance is excited in a wavelength region of approximately 400 nm to 600 nm. The wavelength region of light absorbed in the red fluorescent substance is wider than that of the yellow fluorescent substance illustrated in FIG. 4, and the red fluorescent substance is excited by light from the blue wavelength region to the green wavelength region. In other words, it is possible to treat most of the light in wavelength regions which is incident on the red fluorescent substance as excitation light. In addition, when the red fluorescent substance is excited by light in the green wavelength region, it is possible to reduce heat to be generated as compared with the case where the red fluorescent substance is excited by light in the blue wavelength region. This is because a wavelength difference (i.e. Stokes shift) between light in the green wavelength region and light in the red wavelength region is less than a wavelength difference between light in the blue wavelength region and light in the red wavelength region. Once the amount of heat is reduced when fluorescence is emitted by exciting a fluorescent substance with excitation light, the emission intensity of fluorescence is increased. As a result, it is possible to increase the intensity of light in the red wavelength region which is emitted by exciting a red fluorescent substance.

The emission spectrum of light emitted from the red fluorescent substance has a wavelength region of approximately 600 to 700 nm as demonstrated by a solid line in FIG. 5. When light in the blue wavelength region, and light including light in the green wavelength region and light in the red wavelength region are incident on the second fluorescent substance 125, this decreases the light in the blue wavelength region and the light in the green wavelength region and increases the light in the red wavelength region to make an output from the second fluorescent substance 125.

Figure 6:
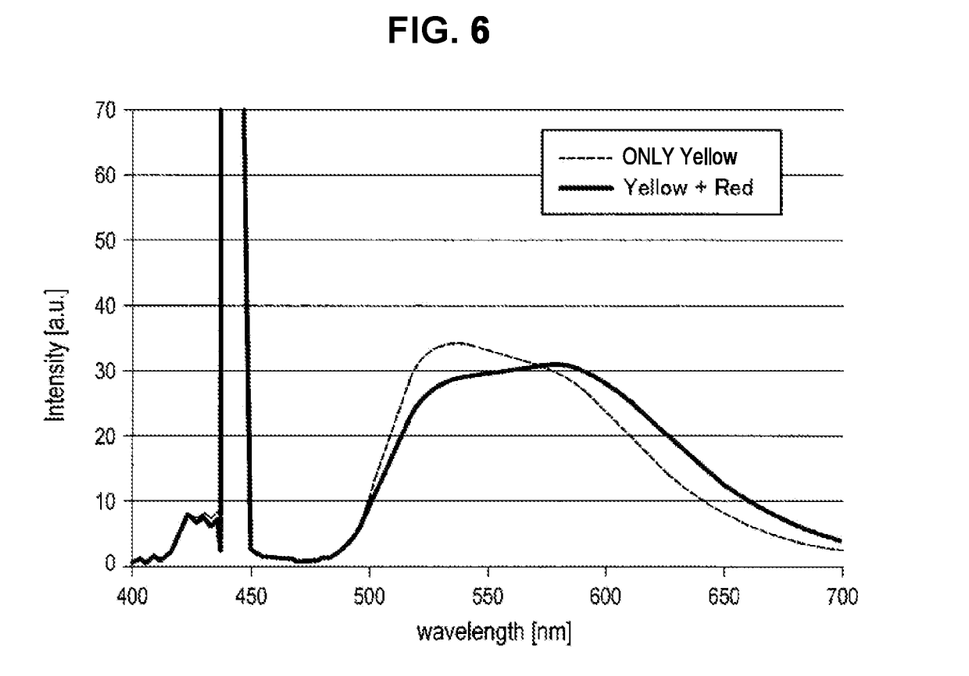
FIG. 6 is a graph illustrating an example of a light source spectrum of light output from the light source apparatus according to the embodiment.

FIG. 6 illustrates an example of the light source spectrum of light output from the light source apparatus 100. In FIG. 6, a light source spectrum represented by a solid line belongs to a light source apparatus in which the two layers of the yellow fluorescent substance and the red fluorescent substance illustrated in FIG. 3 are applied to the base material. A light source spectrum represented by a dashed line belongs to a light source apparatus in which only the yellow fluorescent substance is applied to the base material. In the case where light in the blue wavelength region is combined with light including light in the green wavelength region and light in the red wavelength region which is emitted by exciting the yellow fluorescent substance with the light in the blue wavelength region to generate white light, as demonstrated by a dashed line in FIG. 6, a red component runs short to result in bluish white light.

In contrast, as illustrated in FIG. 3, exciting a yellow fluorescent substance and a red fluorescent substance in order with light in the blue wavelength region increases the intensity of the red wavelength region as demonstrated by a solid line in FIG. 6, and a red component that is running short is compensated. Among fluorescence emitted from a yellow fluorescent substance, there is an excess of especially light in the green wavelength region over the amount of light in the red wavelength region. Then, further providing a red fluorescent substance, and exciting the red fluorescent substance with light in the green wavelength region which is unnecessary for color balance of white light make it possible to efficiently realize light having a desired color.

Note that, in the example illustrated in FIG. 3, a white light source has been described that outputs white light by exciting light in the blue wavelength region with a fluorescent substance, but can also be used as a yellow light source. In this case, it is sufficient to provide a reflection film that reflects light in the blue wavelength region between the first fluorescent substance 123 and the second fluorescent substance 125, and prevent the light in the blue wavelength region from being incident on the second fluorescent substance 125 from the first fluorescent substance 123. In the yellow light source like this, light in the blue wavelength region is not incident on the second fluorescent substance 125. Therefore, it is possible to reduce the amount of heat to be generated when the second fluorescent substance 125 is excited, and increase the emission intensity of fluorescence.

2. Second Embodiment

Figure 7:
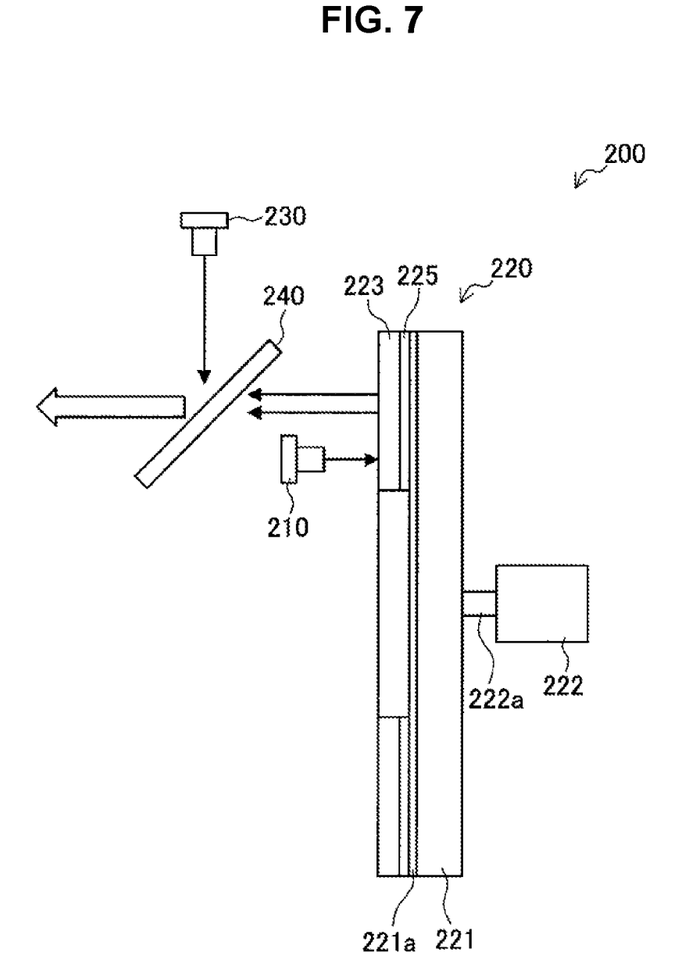
FIG. 7 is a schematic configuration diagram illustrating an example of a light source apparatus according to a second embodiment of the present disclosure.
Figure 8:
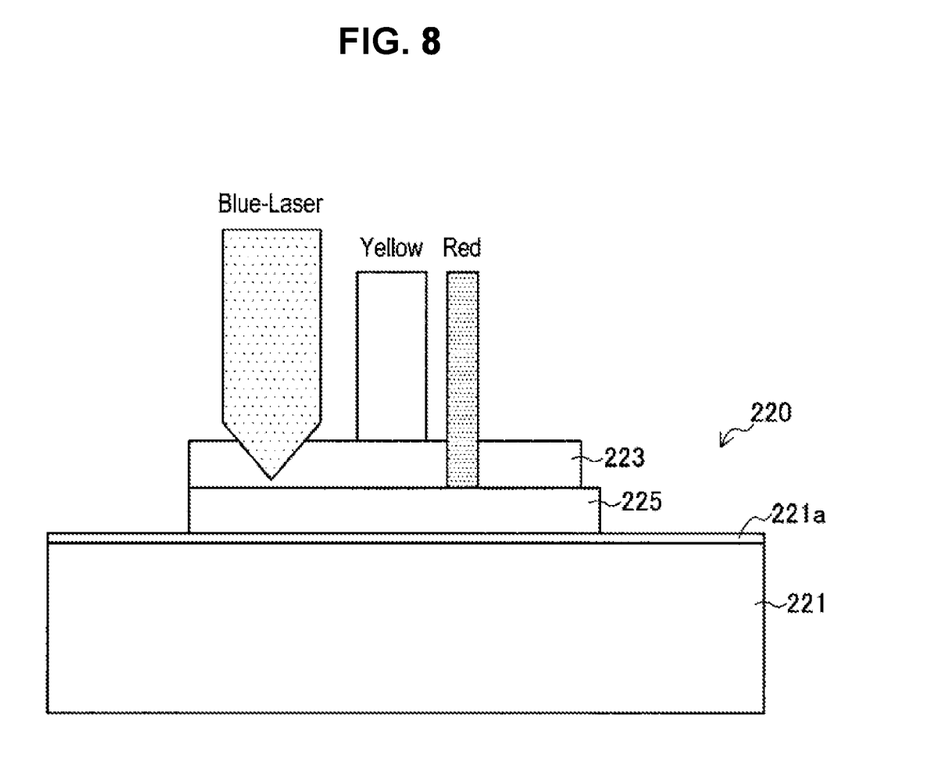
FIG. 8 is an explanatory diagram illustrating a specific example of the light source apparatus according to the embodiment.

Next, on the basis of FIGS. 7 and 8, a configuration example of a light source apparatus 200 according to a second embodiment of the present disclosure will be described. FIG. 7 is a schematic configuration diagram illustrating a configuration example of the light source apparatus 200 according to the present embodiment. FIG. 8 is an explanatory diagram illustrating a specific example of the light source apparatus 200 according to the present embodiment. The light source apparatus 200 according to the present embodiment is also applicable as the light source section of the 3-LCD projector illustrated in FIG. 1. This light source apparatus 200 is different from the light source apparatus 100 according to the first embodiment in that a wavelength conversion member 220 is configured as a reflecting fluorescence wheel. The following describes the configuration of the light source apparatus 200 according to the present embodiment in detail.

2.1. Configuration of Light Source Apparatus

The light source apparatus 200 according to the present embodiment uses a reflecting wavelength conversion member including a plurality of fluorescent substance layers to generate and output white light. For example, as illustrated in FIG. 7, the light source apparatus 200 includes a first light source 210, a wavelength conversion member 220, a second light source 230, and a reflecting dichroic mirror 240.

The first light source 210 is a light emitting section that outputs excitation light which excites a fluorescent substance for the wavelength conversion member 220. The first light source 210 is, for example, a laser diode or the like, and outputs light in a first wavelength region. The light output from the first light source 210 is incident on the wavelength conversion member 220 via a condensing lens (not illustrated).

The wavelength conversion member 220 is a member that converts part of the light output from the first light source 210 into light in a wavelength region different from the first wavelength region of the incident light. To convert the wavelength region of light, a fluorescent substance is used. For example, the wavelength conversion member 2200 is configured as a reflecting fluorescence wheel. Specifically, the wavelength conversion member 220 includes, as illustrated in FIG. 7, a base material 221, a drive section 222, a first fluorescent substance 223, and a second fluorescent substance 225.

The base material 221 is a member on which the first fluorescent substance 223 and the second fluorescent substance 225 are stacked. The base material 221 is, for example, disk-shaped. To the center thereof, a rotary shaft 222a of the drive section 222 is attached. The rotary shaft 222a of the drive section 222 is rotated, thereby making it possible to rotate the base material 221 as well. A laser diode used as the first light source 210 in the light source apparatus 200 according to the present embodiment also serves as a point light source. Therefore, heat is concentrated at the position at which light from the first light source 210 is output, resulting in high temperature. Then, making the wavelength conversion member 220 rotatable makes it possible to distribute light radiation positions on the base material 221.

The first fluorescent substance 223 is one of the two fluorescent substance layers stacked on the base material 221. The first fluorescent substance 223 is provided to face the first light source 210. For example, the first fluorescent substance 223 may be provided on the second fluorescent substance 225 described below in an annular pattern concentric with the disk-shaped base material 221. The first fluorescent substance 223 may be provided onto the second fluorescent substance 225 provided on the base material 221, for example, by applying screen printing to a binder mixed with a fluorescent agent.

The first fluorescent substance 223 is excited by light from the opposite first light source 210, and emits light in a wavelength region which is different from the incident light in the first wavelength region. Note that the first fluorescent substance 223 transmits part of the light output from the first light source 210. Thus, when light in the first wavelength region is incident on the first fluorescent substance 123 from the first light source 210, the light in the first wavelength region and light in a second wavelength region which is emitted by exciting the first fluorescent substance 223 are output. Here, the light in the first wavelength region may be all absorbed in the first fluorescent substance 223, or part thereof may propagate to the base material 221 side or the opposite side to the base material 221. In addition, part of the light in the second wavelength region which is emitted by exciting the first fluorescent substance 223 propagates to the base material 221 side, and part thereof propagates to the opposite side to the base material 221 (i.e. reflecting dichroic mirror 240).

The second fluorescent substance 225 is a fluorescent substance layer disposed between the first fluorescent substance 223 and the base material 221. The second fluorescent substance 225 is provided, for example, to the surface of the base material 221 on the first light source 210 side. Specifically, for example, as illustrated in FIG. 7, the second fluorescent substance 225 may be provided in an annular pattern concentric with the disk-shaped base material 221. The second fluorescent substance 225 is provided onto the base material 221, for example, by applying screen printing to a binder mixed with a fluorescent agent.

The second fluorescent substance 225 is excited by the light output from the first fluorescent substance 223 to the base material 221 side, and emits light in the third wavelength region different from the first wavelength region and the second wavelength region. The light incident on the second fluorescent substance 225 may be light in the second wavelength region alone, or light in the first wavelength region and light in the second wavelength region. In addition, the wavelength (i.e. third wavelength region) of the light emitted from the second fluorescent substance 225 may be greater than the wavelength (i.e. second wavelength region) of the light emitted from the first fluorescent substance 223. Here, a reflection film 221a that reflects at least light in the second wavelength region and light in the third wavelength region is provided between the second fluorescent substance 225 and the base material 221. This makes it possible to output the light in the third wavelength region which is emitted by exciting the second fluorescent substance 225 with incident light to the opposite side to the base material 221. Note that the reflection film 221a may reflect light in all the wavelength regions. The light in the third wavelength region which is emitted from the second fluorescent substance 225 passes through the first fluorescent substance 223, and is incident on the reflecting dichroic mirror 240.

The second light source 230 outputs light in a wavelength region which is not included in the light from the wavelength conversion member 220 or the amount of which is insufficient. For example, similarly to the first light source 210, the second light source 230 is, for example, a laser diode or the like. The second light source 230 may output light in the first wavelength region. The light output from the second light source 230 is incident on the reflecting dichroic mirror 240.

The reflecting dichroic mirror 240 is an optical member that multiplexes the light coming from the wavelength conversion member 220 and the second light source 230, and outputs the multiplexed light in a predetermined direction. For example, the reflecting dichroic mirror 240 transmits the light in the second wavelength region and the light in the third wavelength region which come from the wavelength conversion member 220, reflects the light in the first wavelength region which comes from the second light source 230, and outputs the light in each wavelength region in the same direction. In this way, white light is output from the light source apparatus 200.

2.2. Specific Example

As a specific example of the light source apparatus 200, as illustrated in FIG. 8, the case will be considered where blue laser diodes that emit light in the blue wavelength region are used as the first light source 210 and the second light source 230. The light in the blue wavelength region which is output from the first light source 210 is incident on the first fluorescent substance 223 as illustrated in FIG. 8. Here, the first fluorescent substance 223 is assumed to be a yellow fluorescent substance that is excited by the incident light, and emits light including light in the green wavelength region and light in the red wavelength region. FIG. 8 illustrates light including light in the green wavelength region and light in the red wavelength region as yellow light (Yellow). As FIG. 4 illustrates an example of an excitation spectrum and an emission spectrum of a yellow fluorescent substance, the yellow fluorescent substance can use light in the blue wavelength region to efficiently excite a yellow fluorescent substance, and cause the yellow fluorescent substance to emit light including light in the green wavelength region and light in the red wavelength region. At least part of light in the blue wavelength region which is incident on the first fluorescent substance 223 excites the first fluorescent substance 223 to be light including light in the green wavelength region and light in the red wavelength region. At this time, the light in all the blue wavelength regions may be absorbed in a yellow fluorescent substance that is the first fluorescent substance 223.

The light including light in the green wavelength region and light in the red wavelength region which is output from the first fluorescent substance 223 propagates onto the base material 221 side as illustrated in FIG. 8, and is incident on the second fluorescent substance 225. The second fluorescent substance 225 is assumed to be a red fluorescent substance that is excited by the incident light to emit light in the red wavelength region. As FIG. 5 illustrates an example of the excitation spectrum and the emission spectrum of a red fluorescent substance, exciting the red fluorescent substance with light in the green wavelength region reduces heat to be generated as compared with the case of exciting a red fluorescent substance with light in the blue wavelength region does. This is because a wavelength difference (i.e. Stokes shift) between light in the green wavelength region and light in the red wavelength region is less than a wavelength difference between light in the blue wavelength region and light in the red wavelength region. Once the amount of heat is reduced when fluorescence is emitted by exciting a fluorescent substance with excitation light, the emission intensity of fluorescence is increased. As a result, it is possible to increase the intensity of light in the red wavelength region which is emitted by exciting a red fluorescent substance.

The second fluorescent substance 225 excited by light in the green wavelength region among incident light emits light in the red wavelength region, but this light in the red wavelength region is reflected by the reflection film 221a to propagate onto the opposite side to the base material 221. FIG. 8 illustrates light in the red wavelength region as red light (Red). At this time, the light in the red wavelength region passes through a yellow fluorescent substance that is the first fluorescent substance 223, but the yellow fluorescent substance is hardly excited by the light in the red wavelength region as illustrated in FIG. 4. Therefore, the light in the red wavelength region can pass without losing the amount of light. In this way, making light in the blue wavelength region incident on a fluorescent substance layer in which the two layers of a yellow fluorescent substance and a red fluorescent substance are stacked makes it possible to obtain light having more red components as compared with the case where light in the blue wavelength region is incident on only a yellow fluorescent substance to obtain fluorescence. Then, multiplexing the light obtained by the wavelength conversion member illustrated in FIG. 8 which has a large number of red components and includes light in the green wavelength region and light in the red wavelength region with the light in the blue wavelength region which comes from the second light source makes it possible to generate white light having favorable color balance.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, as an example of the embodiment described above, the case is demonstrated where the blue wavelength region is referred to as first wavelength region, the yellow fluorescent substance is referred to as first fluorescent substance, and the red fluorescent substance is referred to as second fluorescent substance, but the present disclosure is not limited to this example. It is sufficient to decide the wavelength region of light output from a light source and the characteristics of each fluorescent substance in accordance with shades of light realized by the light source apparatus.

In addition, in the embodiment described above, the case is demonstrated where the wavelength conversion member is provided with two fluorescent substance layers, but the present disclosure is not limited to this example. For example, the wavelength conversion member may be provided with three or more fluorescent substance layers. In this way, the light source apparatus according to the present disclosure has a plurality of fluorescent substance layers stacked thereon. However, in this case, it is sufficient that each fluorescent substance is stacked such that emitted fluorescence has a greater wavelength in order from the incidence direction of light that excites a fluorescent substance.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A light source apparatus including:

a light source configured to output light in a first wavelength region; and a wavelength conversion member including a first fluorescent substance and a second fluorescent substance, the first fluorescent substance being excited by the light in the first wavelength region to emit light in a second wavelength region, the second fluorescent substance being stacked on the first fluorescent substance and excited by the light in the first wavelength region and the light in the second wavelength region to emit light in a third wavelength region.

(2)

The light source apparatus according to (1), in which a wavelength of fluorescence emitted from the second fluorescent substance is greater than a wavelength of fluorescence emitted from the first fluorescent substance.

(3)

The light source apparatus according to (1) or (2), in which the light in the first wavelength region which is output from the light source is light in a blue wavelength region, and the first fluorescent substance is a yellow fluorescent substance, and the second fluorescent substance is a red fluorescent substance.

(4)

The light source apparatus according to any one of (1) to (3), in which the first fluorescent substance is disposed closer to the light source side than the second fluorescent substance.

(5)

The light source apparatus according to any one of (1) to (4), in which a base material provided with the first fluorescent substance and the second fluorescent substance includes a transparent member, the first fluorescent substance is stacked on a surface opposite to an incidence surface of the base material on which the light in the first wavelength region which is output from the light source is incident, the second fluorescent substance is stacked on the first fluorescent substance, and a reflection film is provided between the base material and the first fluorescent substance, the reflection film reflecting the light in the second wavelength region.

(6) The light source apparatus according to any one of (1) to (4), in which
the second fluorescent substance is stacked on a base material,
the first fluorescent substance is stacked on the second fluorescent substance stacked on the base material, and
a reflection film is provided between the base material and the second fluorescent substance, the reflection film reflecting at least the light in the second wavelength region and the light in the third wavelength region.

(7) The light source apparatus according to any one of (1) to (6), in which
the first fluorescent substance and the second fluorescent substance are stacked on a rotatable base material.

(8) A projection display apparatus including:
a light source section;
a light modulation synthesis system configured to modulate and synthesize incident light;
an illumination optical system configured to guide light output from the light source section to the light modulation synthesis system; and
a projection optical system configured to project an image output from the light modulation synthesis system, in which
the light source section includes
a light source configured to output light in a first wavelength region, and
a wavelength conversion member including a first fluorescent substance and a second fluorescent substance,
the first fluorescent substance being excited by the light in the first wavelength region to emit light in a second wavelength region, the second fluorescent substance being stacked on the first fluorescent substance and excited by the light in the first wavelength region and the light in the second wavelength region to emit light in a third wavelength region.

REFERENCE SIGNS LIST 1 projection display apparatus
100, 200 light source apparatus
110 light source
120, 220 wavelength conversion member
121, 221 base material
121a, 221a reflection film
122, 222 drive section
122a, 222a rotary shaft
123, 223 first fluorescent substance
125, 225 second fluorescent substance
210 first light source
230 second light source
240 reflecting dichroic mirror

The invention claimed is:

1. A light source apparatus comprising:
a light source configured to output first light in a projection display apparatus, the first light being in a first wavelength region;
a wavelength conversion member including a first fluorescent substance and a second fluorescent substance, the first fluorescent substance being excited by the first light in the first wavelength region to emit second light in a second wavelength region, a peak intensity of the second light emitted exceeding a peak intensity of the first light, the second fluorescent substance being stacked on the first fluorescent substance and excited by the first light in the first wavelength region and the second light in the second wavelength region to emit third light in a third wavelength region, wherein the second fluorescent substance is a red fluorescent substance and a thickness of the second fluorescent substance is thinner than that of the first fluorescent substance, which is a yellow fluorescent substance, wherein the first fluorescent substance and the second fluorescent substance, which are stacked together, form a circular ring surrounding a disk-shaped base material; and
a reflection film provided between the disk-shaped base material and the first fluorescent substance, the first light passes through the disk-shaped base material and the reflection film, the reflection film reflects the second light in the second wavelength region which is emitted by exciting the first fluorescent substance so that the second light is reflected onto the second fluorescent substance and prevented from being output to the disk-shaped base material that is transparent.

2. The light source apparatus according to claim 1, wherein
a second wavelength of fluorescence emitted from the second fluorescent substance is greater than a first wavelength of fluorescence emitted from the first fluorescent substance.

3. The light source apparatus according to claim 1, wherein
the first light in the first wavelength region which is output from the light source is light in a blue wavelength region.

4. The light source apparatus according to claim 1, wherein
the first fluorescent substance is disposed closer to a side of the light source than the second fluorescent substance.

5. The light source apparatus according to claim 1, wherein
the disk-shaped base material is provided with the first fluorescent substance,
the first fluorescent substance is stacked on a surface opposite to an incidence surface of the disk-shaped base material on which the first light in the first wavelength region which is output from the light source is incident, and
the second fluorescent substance is stacked on the first fluorescent substance.

6. The light source apparatus according to claim 1, wherein
the second fluorescent substance is stacked on the first fluorescent substance stacked on the disk-shaped base material.

7. The light source apparatus according to claim 1, wherein
the first fluorescent substance and the second fluorescent substance are stacked on the disk-shaped base material that is rotatable.

8. A projection display apparatus comprising:
a light source section;
a light modulation synthesis system configured to modulate and synthesize incident light;
an illumination optical system configured to guide light output from the light source section to the light modulation synthesis system; and a projection optical system configured to project an image output from the light modulation synthesis system, wherein the light source section includes:

a light source configured to output first light in a first wavelength region, a wavelength conversion member including a first fluorescent substance and a second fluorescent substance, the first fluorescent substance being excited by the first light in the first wavelength region to emit second light in a second wavelength region, a peak intensity of the second light emitted exceeding a peak intensity of the first light, the second fluorescent substance being stacked on the first fluorescent substance and excited by the first light in the first wavelength region and the second light in the second wavelength region to emit third light in a third wavelength region, wherein the second fluorescent substance is a red fluorescent substance and a thickness of the second fluorescent substance is thinner than that of the first fluorescent substance, which is a yellow fluorescent substance, wherein the first fluorescent substance and the second fluorescent substance, which are stacked together, form a circular ring surrounding a disk-shaped base material, and a reflection film provided between the disk-shaped base material and the first fluorescent substance, the first light passes through the disk-shaped base material and the reflection film, the reflection film reflects the second light in the second wavelength region which is emitted by exciting the first fluorescent substance so that the second light is reflected onto the second fluorescent substance and prevented from being output to the disk-shaped base material that is transparent.

9. The light source apparatus according to claim 1, wherein the peak intensity of the first light does not exceed 100 a.u.

10. The projection display apparatus according to claim 8, wherein the peak intensity of the first light does not exceed 100 a.u.

* * * * *